(12) United States Patent
Zhang et al.

(10) Patent No.: US 9,937,919 B2
(45) Date of Patent: Apr. 10, 2018

(54) SYSTEM AND METHOD FOR COUPLED AND DECOUPLED ENGINE STARTING IN A HYBRID VEHICLE

(71) Applicant: Ford Global Technologies, LLC, Dearborn, MI (US)

(72) Inventors: Chen Zhang, Westland, MI (US); Xiaoyong Wang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/066,263

(22) Filed: Mar. 10, 2016

(65) Prior Publication Data

US 2017/0259810 A1 Sep. 14, 2017

(51) Int. Cl.

| | |
|---|---|
| *B60K 6/547* | (2007.10) |
| *B60W 10/02* | (2006.01) |
| *B60K 6/387* | (2007.10) |
| *B60W 10/08* | (2006.01) |
| *B60L 11/12* | (2006.01) |
| *B60K 6/26* | (2007.10) |
| *B60W 20/40* | (2016.01) |
| *B60W 20/50* | (2016.01) |

(52) U.S. Cl.
CPC ............... *B60W 20/40* (2013.01); *B60K 6/26* (2013.01); *B60K 6/387* (2013.01); *B60K 6/547* (2013.01); *B60L 11/123* (2013.01); *B60W 10/02* (2013.01); *B60W 10/08* (2013.01); *B60W 20/50* (2013.01); *B60K 2006/268* (2013.01); *B60Y 2300/63* (2013.01); *B60Y 2400/46* (2013.01); *B60Y 2400/608* (2013.01);

*Y10S 903/906* (2013.01); *Y10S 903/914* (2013.01); *Y10S 903/919* (2013.01); *Y10S 903/93* (2013.01)

(58) Field of Classification Search
CPC ...... B60W 20/40; B60W 10/02; B60W 10/08; B60W 20/50; B60K 6/26; B60K 6/387; B60K 6/547; B60K 2006/268; B60L 11/123; B60Y 2300/63; B60Y 2400/46; B60Y 2400/608; Y10S 903/906; Y10S 903/914; Y10S 903/919; Y10S 903/93
See application file for complete search history.

(56) References Cited

U.S. PATENT DOCUMENTS

| | | | |
|---|---|---|---|
| 6,396,165 B1 * | 5/2002 | Nagano .................... | B60K 6/42 290/40 R |
| 6,524,217 B1 * | 2/2003 | Murakami ............. | B60K 6/365 180/65.225 |
| 6,581,559 B1 * | 6/2003 | Grob ........................ | F02N 5/04 123/179.3 |

(Continued)

*Primary Examiner* — Tuan C To
(74) *Attorney, Agent, or Firm* — David B. Kelley; Brooks Kushman P.C.

(57) ABSTRACT

A system and method for controlling engine starting in a hybrid vehicle having first and second electric machines include starting the engine in response to an engine start request using the first electric machine and releasing second electric machine reserved engine starting torque for use in propelling the vehicle. The first electric machine may be controlled to start the engine in response to the first engine start after key-on and when the vehicle speed is below a corresponding threshold, with the second electric machine used when vehicle speed is above the threshold. The first electric machine may be an integrated starter-generator.

9 Claims, 3 Drawing Sheets

(56) References Cited

U.S. PATENT DOCUMENTS

| | | | |
|---|---|---|---|
| 6,655,485 B1* | 12/2003 | Ito | B60W 20/40 180/65.6 |
| 7,367,416 B2 | 5/2008 | Seufert et al. | |
| 8,447,451 B2 | 5/2013 | Kim et al. | |
| 8,738,205 B2 | 5/2014 | Steuernagel et al. | |
| 8,758,192 B2 | 6/2014 | Smith et al. | |
| 8,894,540 B2 | 11/2014 | Hashemi et al. | |
| 9,086,045 B2 | 7/2015 | Wang et al. | |
| 9,108,633 B1* | 8/2015 | Atluri | B60W 20/10 |
| 9,303,571 B2* | 4/2016 | Yu | F02D 28/00 |
| 2009/0299549 A1* | 12/2009 | Albertson | B60W 10/06 701/2 |
| 2011/0005486 A1* | 1/2011 | Nakamura | F02N 11/0837 123/179.4 |
| 2011/0178695 A1* | 7/2011 | Okumoto | F02N 11/0844 701/103 |
| 2013/0311055 A1* | 11/2013 | Whitney | B60W 30/18027 701/54 |
| 2014/0067183 A1 | 3/2014 | Sisk | |
| 2014/0190157 A1* | 7/2014 | Krittian | E02F 9/2066 60/445 |
| 2014/0288736 A1* | 9/2014 | Martin | F02D 29/02 701/22 |
| 2014/0379184 A1* | 12/2014 | Kim | F02N 11/108 701/22 |
| 2015/0112523 A1 | 4/2015 | Wang et al. | |
| 2015/0175153 A1* | 6/2015 | Hashimoto | F01N 3/2013 701/22 |
| 2015/0258886 A1* | 9/2015 | Aimo Boot | B60K 6/52 701/22 |
| 2016/0052511 A1* | 2/2016 | Takeuchi | F02N 5/04 701/22 |
| 2016/0107633 A1* | 4/2016 | Liang | B60W 20/10 701/22 |
| 2016/0221576 A1* | 8/2016 | Wang | B60W 30/14 |
| 2017/0021826 A1* | 1/2017 | Debert | B60K 6/48 |
| 2017/0036662 A1* | 2/2017 | Chen | B60W 10/06 |
| 2017/0050630 A1* | 2/2017 | Park | B60W 20/10 |
| 2017/0096134 A1* | 4/2017 | Yoon | B60K 6/547 |
| 2017/0101086 A1* | 4/2017 | Oshiumi | B60W 20/40 |
| 2017/0197614 A1* | 7/2017 | Burt | B60K 6/46 |

\* cited by examiner

SYSTEM AND METHOD FOR COUPLED AND DECOUPLED ENGINE STARTING IN A HYBRID VEHICLE

TECHNICAL FIELD

This application is directed to systems and methods for starting an engine in a hybrid vehicle with the engine coupled or decoupled from an electric machine.

BACKGROUND

Hybrid vehicles include an engine and an electric machine that operates as a motor/generator with an associated battery to provide an electric vehicle (EV) mode using only electric power to propel the vehicle, or a hybrid electric vehicle (HEV) mode that uses the engine and motor to propel the vehicle. Hybrid vehicles may start the engine using a dedicated starter motor and/or various types and sizes of electric machines that may function as a motor/generator or an integrated starter-generator (ISG). The engine may be started frequently under various operating conditions to transition between EV and HEV operating modes such that the selected starting strategy may significantly impact overall vehicle efficiency, performance, and drivability.

The electric machine of a hybrid vehicle may be coupled to the engine to start the engine under various operating conditions. However, this requires that the electric machine reserve sufficient torque capacity during operation to crank the engine and overcome engine friction and inertia such that the torque or battery power is not fully available to propel the vehicle when operating in EV mode. Depending on engine size and engine temperature, the torque reserved for cranking the engine during starting may be significant, e.g. from 80-150 Nm, which may represent up to 40% or more of the maximum torque available. In addition, coupling the engine to driveline components during starting may introduce torque disturbances that reduce vehicle efficiency and drivability. Similarly, vehicles that rely only on a dedicated starter or ISG may have disadvantages with respect to cost and efficiency.

SUMMARY

In one or more embodiments, a vehicle includes an engine, a first electric machine selectively coupled to the engine by a first clutch, second electric machine coupled to the engine, a step-ratio transmission selectively coupled to the electric machine by a second clutch, and a processor programmed to release reserved torque for use by the first electric machine to propel the vehicle in response to selection of the second electric machine for a subsequent engine start. The second electric machine may be a starter motor or an integrated starter-generator, which may be a belt-driven integrated starter-generator coupled to the engine by a belt. The processor may be further programmed to control the second electric machine to start the engine for a first engine start after a vehicle key-on, and to control the second electric machine to start the engine in response to an engine start request and vehicle speed being below an associated threshold. In various embodiments, the processor is programmed to control the second electric machine to start the engine in response to an engine start request and a fault associated with the first electric machine, and to control the first electric machine to start the engine in response to an engine start request and a fault associated with the second electric machine. The processor may also be programmed to control the first electric machine and the first clutch to start the engine in response to an engine start request and vehicle speed being above a corresponding threshold.

Various embodiments include a vehicle having an engine with a starter motor and coupled by a first clutch to an electric machine, which is coupled by a second clutch to a step-ratio transmission and a processor programmed to start the engine using the starter motor for a first engine start after vehicle key-on or if vehicle speed is less than an associated threshold, and using the electric machine if vehicle speed exceeds the associated threshold. The processor may be further programmed to start the engine using the electric machine in response to a starter motor fault and programmed to start the engine using the starter motor in response to an electric machine fault. The processor may also be programmed to disengage the first clutch when starting the engine using the starter motor, and to engage the first clutch before starting the engine using the electric machine. In one or more embodiments, the processor is programmed to release electric machine torque reserved for starting the engine to propel the vehicle during operation of the vehicle in response to scheduling a subsequent engine start using the starter motor. The processor may be further programmed to reserve electric machine torque for a subsequent engine start in response to pre-selecting the starter motor for a subsequent engine start.

Embodiments also include a method for controlling a hybrid vehicle that may include starting an engine using a first electric machine in response to a first engine start request after key-on or when vehicle speed is below a threshold, and starting the engine using a second electric machine coupled to the engine through an engaged clutch in response to the vehicle speed being above the threshold or a fault in the first electric machine. The method may also include disengaging the clutch prior to starting the engine using the first electric machine, which may be a starter motor or an integrated starter-generator, for example. The method may include releasing reserved torque of the second electric machine for vehicle propulsion in response to scheduling a subsequent engine start using the first electric machine. In at least one embodiment, the method includes scheduling a subsequent engine start using the first electric machine to release reserved torque of the second electric machine for use in propelling the vehicle.

Various embodiments may provide one or more advantages. For example, engine starting in a hybrid vehicle according to various embodiments provides robust and efficient engine starts based on current vehicle and ambient operating conditions. One or more embodiments provide dynamic release of motor torque otherwise reserved for engine starting for use in propelling the vehicle, which may improve overall vehicle energy efficiency.

The above advantages and other advantages and features of various embodiments of the claimed subject matter may be recognized by those of ordinary skill in the art based on the representative embodiments described and illustrated.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
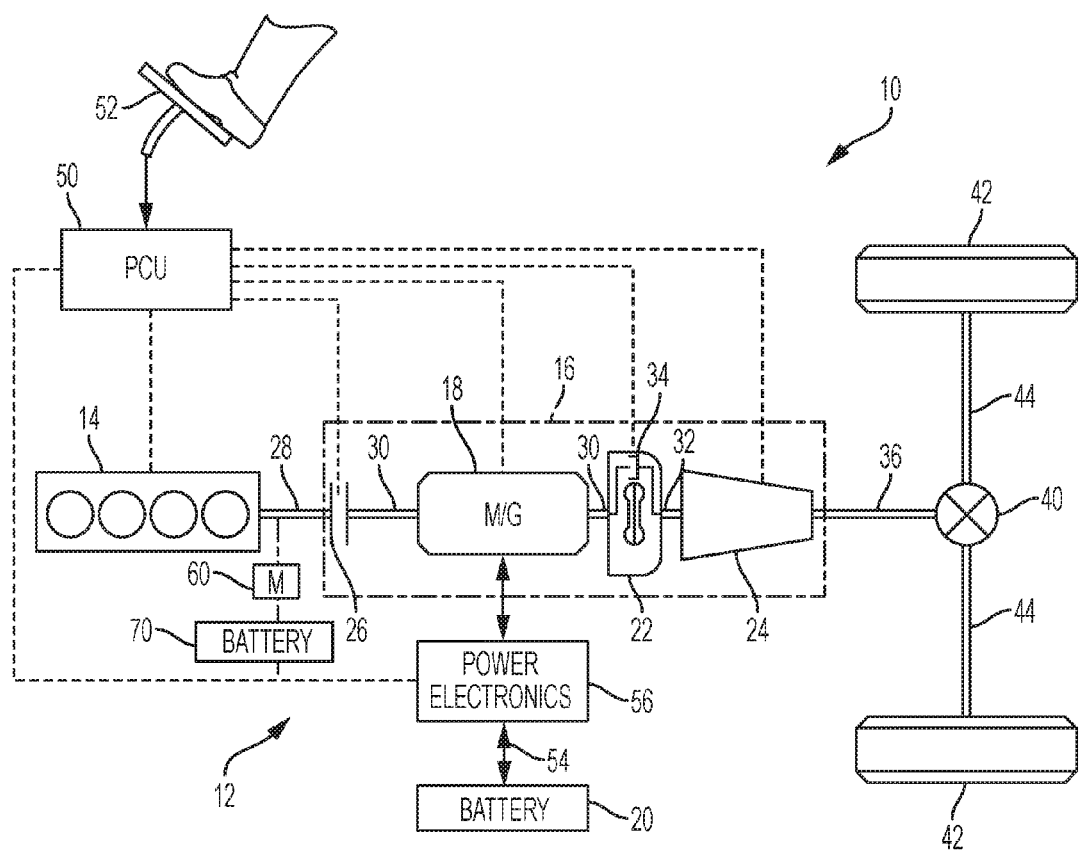
FIG. 1 is a schematic diagram illustrating a representative hybrid vehicle in a system or method for engine starting according to various embodiments.

Referring to FIG. 1, a schematic diagram of a hybrid electric vehicle (HEV) 10 is illustrated incorporating a system and method for engine starting according to an embodiment of the present disclosure. FIG. 1 illustrates representative configuration of various hybrid vehicle components. Physical placement and orientation of the components within the vehicle may vary depending on the particular application and configuration. The HEV 10 includes a powertrain 12. The powertrain 12 includes an engine 14 and driveline 16, which may be referred to as a modular hybrid transmission (MHT). As will be described in further detail below, driveline 16 may include an electric machine such as an electric motor/generator (M/G) 18, an associated traction battery 20, a torque converter 22, a multiple step-ratio automatic transmission or gearbox 24, and various other components.

The engine 14 and the M/G 18 are both drive sources for the HEV 10. The engine 14 generally represents a power source that may include an internal combustion engine such as a gasoline, diesel, or natural gas powered engine, or a fuel cell, for example. The engine 14 generates an engine power and corresponding engine torque that is selectively supplied to the M/G 18 through a first clutch or disconnect clutch 26 between the engine 14 and the M/G 18 based on the engagement state of clutch 26. The M/G 18 may be implemented by any one of a number of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible for starting the engine or for propelling vehicle. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate or decouple the engine 14 from the remainder of the powertrain 12 such that the M/G 18 can act as the sole drive source for the HEV 10. In the embodiment illustrated in FIG. 1, shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A second clutch implemented by a torque converter bypass clutch 34 in this embodiment may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch to selectively couple M/G 18 to gearbox 24. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch or first clutch and launch clutch 34 (which may be a torque converter bypass clutch) is generally referred to as a downstream clutch or second clutch.

Vehicle 10 may include an electric machine 60 associated with the crankshaft or output shaft 28 of engine 14. Electric machine 60 may be powered by a low voltage battery 70 to selective start engine 14 in response to an engine start request from one or more vehicle controllers as described in greater detail below. Low voltage battery 70 may be connected to the vehicle electrical system including power electronics 56, which may include a DC/DC converter to provide low voltage power to various vehicle accessories. Low voltage battery 70 may be constructed differently and use different chemistry than high voltage traction battery 20. For example, low voltage battery 70 may be a lead-acid battery while traction battery 20 is a lithium-ion battery. In some embodiments, electric machine 60 may be connected to the low voltage electrical distribution system directly without a low voltage battery 70, or in parallel with a low voltage battery 70. Electric machine 60 may function as a motor or a motor/generator and may be implemented by a starter motor or various types of an integrated starter-generator (ISG) as illustrated and described in greater detail with reference to FIGS. 2A-2D.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gear shifting may be hydraulically actuated similar to a conventional automatic transmission, or electromechanically actuated, similar to an automated mechanical transmission. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, or higher efficiency requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that is programmed or configured to control various actuators in response to signals from various sensors to control functions such as starting/stopping engine 14, operating M/G 18 to and clutch 26 to start engine 14 and/or provide wheel torque or charge battery 20, select or schedule transmission shifts, etc. Similarly, PCU 50 may control electric machine 60 to start or crank engine 14, may schedule or pre-schedule an engine starting device such as electric machine 18 or electric machine 60 for a subsequent engine start, or may control electric machine 60 to charge battery 70, for example, depending on the particular application and implementation of electric machine 60.

Controller 50 may include a microprocessor, processor, or central processing unit (CPU) in communication with various types of non-transitory computer readable storage devices or media. Non-transitory computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, M/G 18, transmission gearbox 24, disconnect clutch 26, launch clutch 34, power electronics 56, and electrical machine 60. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, electric machine or ISG operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer or processor to perform a method to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode", "hybrid electric vehicle (HEV)" mode, or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. Power electronics 56 may also include a DC/DC converter to convert high voltage DC power from traction battery 20 to low voltage DC power for various vehicle accessories. The PCU 50 commands the power electronics 56 to convert voltage from the battery 20 to an AC voltage provided to the M/G 18 to provide positive or negative torque to the shaft 30. This operation mode may be referred to as an "electric only" or "electric vehicle (EV)" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. As illustrated and described in greater detail with respect to FIGS. 2-4, PCU 50 may select one of M/G 18 and electric machine 60 to crank or start engine 14. Use of M/G 18 operating as a first electric machine to start engine 14 includes operation of clutch 26 to at least partially couple M/G 18 to engine 14. Engine starting torque may be reserved from M/G by imposing a higher minimum battery state of charge (SOC) of battery 20, or limiting output torque while operating in the EV mode so that M/G can supply sufficient torque to start engine 14, for example. This may be a significant portion of the maximum available torque. For example, depending on the engine size, type, and temperature, the torque reserved for cranking the engine during starting could vary from 80-150 Nm compared to a M/G maximum torque of about 200-300 Nm. As such, various embodiments schedule or pre-schedule electric machine 60 for a subsequent engine start so that the otherwise reserved starting torque of M/G may be released and used to propel the vehicle.

In at least one embodiment, PCU 50 includes a processor programmed to release reserved torque for use by electric machine 18 to propel the vehicle in response to selection of electric machine 60 for a subsequent engine start. In an embodiment with electric machine 60 implemented by a low voltage starter motor, PCU 50 includes a processor programmed to start engine 14 using the starter motor (electric machine 60) for a first engine start after a vehicle key-on or if vehicle speed is less than an associated threshold, and using the electric machine 18 to start the engine if vehicle speed exceeds the associated threshold.

It should be understood that the schematic illustrated in FIG. 1 is merely representative and is not intended to be limiting. Other configurations are contemplated that utilize selective engagement of both an engine and a motor to transmit torque through the transmission. For example, the M/G 18 may be offset from the crankshaft 28, an additional motor or ISG may be provided to start the engine 14, and/or the M/G 18 may be provided between the torque converter 22 and the gearbox 24. Other configurations are contemplated without deviating from the scope of the present disclosure.

FIGS. 2A-2D illustrate various embodiments of a vehicle system having an electric machine that may be used to schedule a subsequent decoupled engine start and start an engine based on current vehicle and/or ambient operating conditions. As described above, use of an electric machine such as a starter motor or ISG provides a decoupled engine start with the engine decoupled from downstream components of the driveline and allows release of reserved starting torque for the traction motor (M/G 18 in FIG. 1).

Figure 2A:
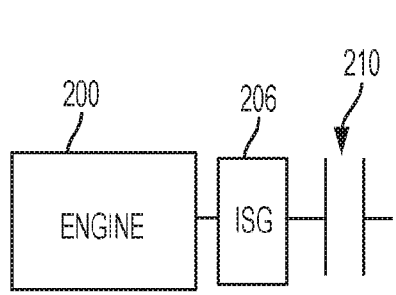
FIGS. 2A-D illustrate various alternative embodiments of a hybrid vehicle having an electric machine for starting an engine.

The first electric machine of the vehicle is implemented by an ISG in the representative embodiment illustrated in FIG. 2A. Engine 200 includes an ISG 206 mounted on the same shaft as the upstream side of the disconnect or first clutch 210, which selectively couples engine 200 and ISG 206 to a second electric machine (such as M/G 18 of FIG. 1) connected to the downstream side of clutch 210. ISG 206 may be connected to a low voltage battery or power source (such as a 12V, 24V, 36V, or 48V power source, for example) or a high voltage battery through power electronics as previously described. A vehicle controller controls ISG to start engine 200 in response to an engine start request for corresponding vehicle and/or ambient operating conditions. Clutch 210 may be controlled so that it is partially engaged (slipping) or disengaged (also referred to as open) to provide a decoupled engine start with the downstream powertrain or driveline components decoupled from the engine 200 and ISG 206. ISG 206 is typically not sized to provide enough torque to start engine 200 with clutch 210 engaged or closed.

Figure 2B:
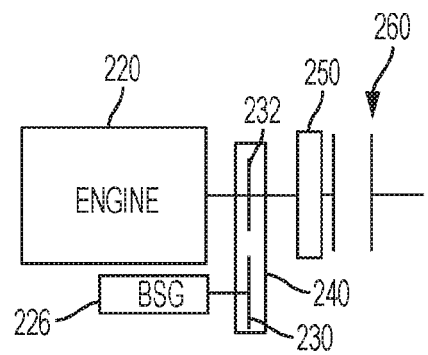
Figure 2C:
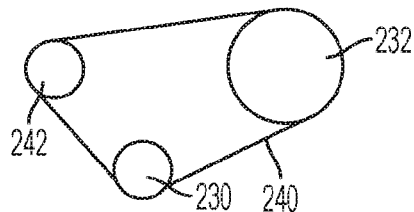

FIGS. 2B and 2C illustrate a representative embodiment of a hybrid vehicle having a belt-driven ISG, which may also be referred to as a BSG or BISG. FIG. 2B is a schematic side view and FIG. 2C illustrates an end view with various components omitted for clarity. Engine 220 may be coupled to BSG 226 using various pulleys and one or more belts. In the illustrated embodiment, BSG 226 is coupled to a starter-generator pulley 230, which is coupled to an engine shaft pulley 232 by a belt 240. This embodiment may also include a starter pulley 242 that applies tension to belt 240 to selectively engage and disengage BSG 226 from rotating with engine shaft pulley 232. An engine flywheel 250 is positioned upstream of the disconnect clutch 260. The embodiment of FIGS. 2B, 2C operates in a similar fashion as described above with respect to FIG. 2A to provide a decoupled engine start with clutch 260 partially disengaged (slipping) or fully disengaged (open). BSG 226 may be used to enhance the conventional low voltage (e.g. 12V) generator to have motoring capability. Engine 220 may be permanently coupled to BSG 226 through belt 240, or selectively engaged and disengaged as previously described.

Figure 2D:
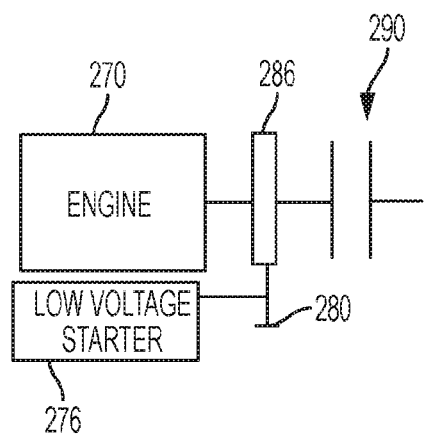

A low voltage starter motor embodiment is illustrated schematically in FIG. 2D. Engine 270 includes a low voltage (such as 12V, 24V, 48V, etc.) starter 276 coupled by a starter gear 280 to engine flywheel 286. Disconnect clutch 290 may be operated as previously described with respect to the ISG embodiments to provide a decoupled engine start by partially or fully disengaging clutch 290. Low voltage starter 276 is energized in response to an engine start request to crank and start engine 270.

Figure 3:
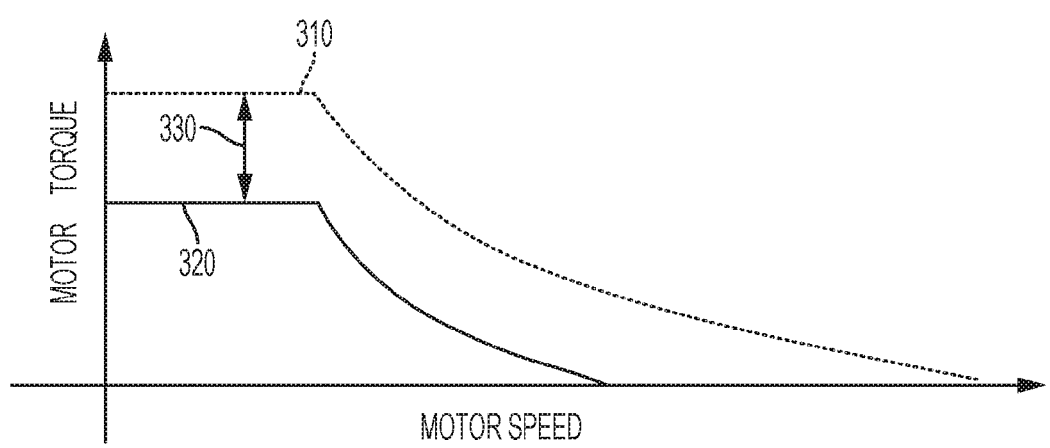
FIG. 3 is a graph illustrating torque reserve and release of an electric machine that may be used for engine starting in a hybrid vehicle according to various embodiments.

FIG. 3 is a chart illustrating operation of an electric machine with an engine starting torque reserve. In the representative graph of FIG. 3, electric machine or motor torque is plotted as a function of motor speed. Line 310 represents the maximum torque for current operating conditions, such as a battery state of charge, for example. Line 320 represents torque available for propelling the vehicle to provide a torque reserve, indicated at 330, so that there is sufficient torque available to start the engine. As previously described and illustrated and described with reference to the flowchart of FIG. 4, the torque reserve 330 may be released and used by the motor to propel the vehicle if the controller has selected or scheduled another electric machine, such as a starter motor or ISG, to start the engine in response to an engine start request.

Figure 4:
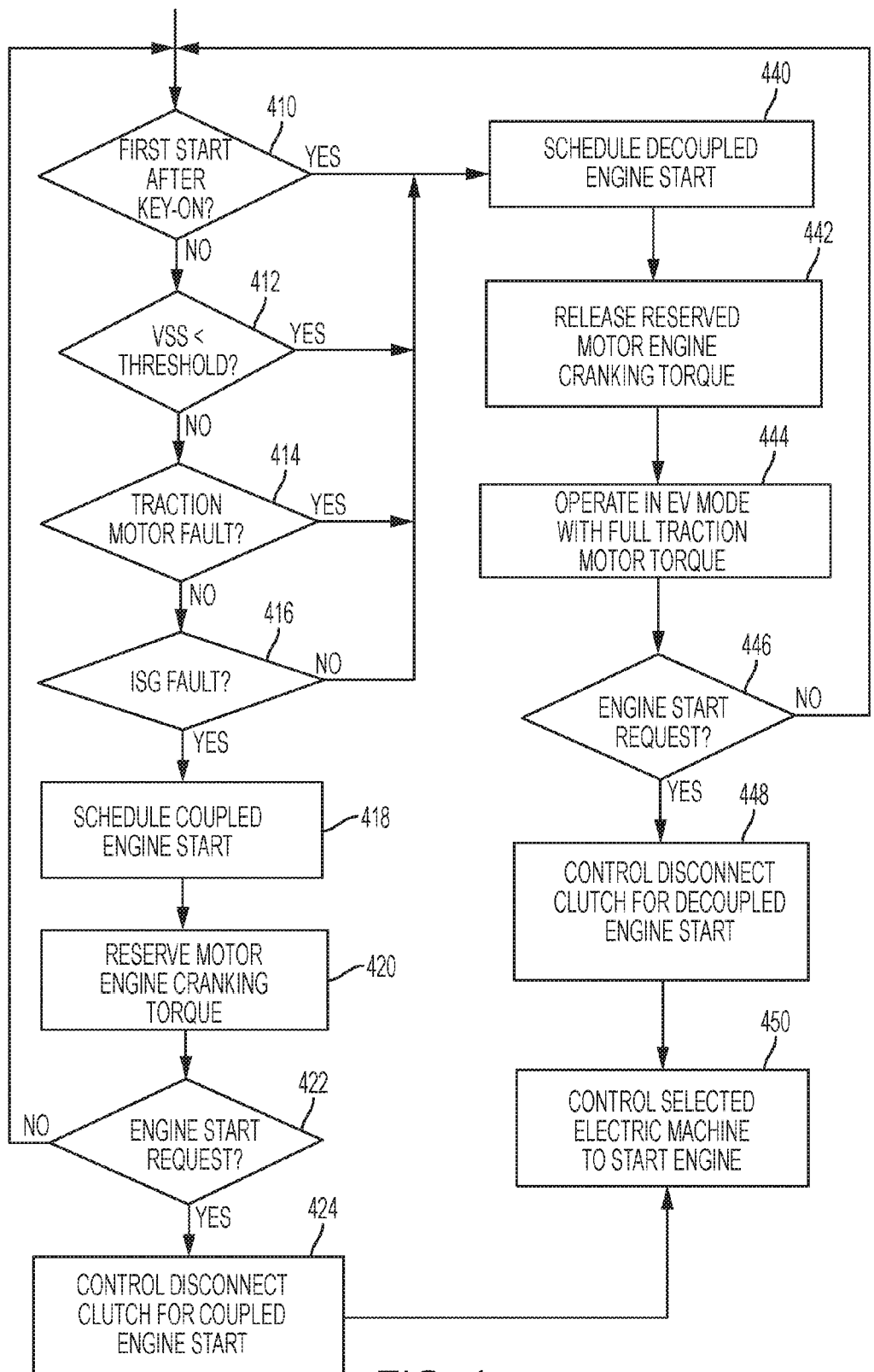
FIG. 4 is a flow chart illustrating operation of a system or method for engine starting according to various embodiments.

FIG. 4 is a flowchart illustrating operation of a system or method for controlling a vehicle according to representative embodiments. As previously described, those of ordinary skill in the art will recognize that the illustrated functions or features may be performed by a programmed processor or controller, such as PCU 50 to select or schedule an engine starting device for a subsequent engine start. The present disclosure recognizes that vehicles that rely almost exclusively on a coupled engine start or decoupled engine start have associated advantages and disadvantages. For example, coupled engine starting requires no additional hardware and therefore reduces costs and part counts, as well as having longer life for the electric machine used to start the engine relative to a conventional low voltage starter motor. However, an engine start with the engine coupled to the driveline and providing driving torque may negatively impact drivability and torque delivery to the wheels and also requires the a torque reserve so that less torque is available for EV operation. In addition, this strategy may be difficult to implement with consistent performance against noise factors in all driving conditions. Systems relying only on decoupled engine starts provide a smooth engine start (because the engine is decoupled from torque delivery) and provide more EV capability because the maximum available motor torque may be used to propel the vehicle. However, this strategy requires an additional electric machine or larger starting devices. As such, various embodiments of the present disclosure leverages advantages of these two engine starting strategies and reduces the disadvantages by selecting a starting strategy based on current vehicle and ambient operating conditions.

Blocks 410-416 of FIG. 4 illustrate representative ambient and/or operating conditions that may be used to select or schedule a coupled engine start or a decoupled engine start. Block 410 determines whether the engine start is the first start after a key-on is detected. If block 410 determines that it is the first engine start after key-on, then a decoupled engine start is scheduled using a starter motor, ISG, BSG, etc. as represented at block 440. Otherwise, block 412 determines whether the vehicle speed is below a corresponding vehicle speed threshold. If the vehicle speed (VSS) is below a corresponding threshold, then a decoupled engine start is scheduled as represented at 440. Otherwise, block 414 determines whether the traction motor or electric machine has a fault that may affect engine starting. In response to a traction motor fault that may affect engine cranking or starting as represented at 414, a decoupled engine start is scheduled as represented at 440. Otherwise, block 416 determines whether there is an ISG (or starter motor) fault and schedules a decoupled engine start if no ISG fault exists as represented at 440, or schedules a coupled engine start as represented at 418 if an ISG (or starter motor) fault exists. Various other vehicle or ambient conditions may be used in combination with or in place of one or more conditions as represented by blocks 410-416 to select or schedule an engine starting strategy and corresponding device based on current vehicle and/or ambient operation conditions.

If a coupled engine start is selected or scheduled using the a first electric machine, such as a traction motor/generator as indicated at block 418, motor torque may be reserved to provide engine cranking torque when an engine start is requested as represented at 420. When an engine start is requested as represented at 422, the disconnect clutch will be controlled (engaged) for a coupled engine start as represented at 424 and the selected or scheduled electric machine (the traction motor/generator in this case) will be controlled to crank or start the engine as represented at 450.

When a decoupled engine start is selected or scheduled as represented at block 440, any previously reserved motor torque for use in cranking the engine may be released as represented by block 442 for use in propelling the vehicle during operation in EV mode as represented by block 444. When a subsequent engine start is requested as represented at 446, the disconnect clutch may be controlled (partially or fully released, disengaged, or open) as represented at 448. The corresponding selected electric machine is controlled to crank the engine as represented at 450. For decoupled engine starts the corresponding electric machine may include a starter motor, ISG, or BSG, for example.

As generally illustrated in FIG. 4, a method for controlling a hybrid vehicle may include starting an engine using a first electric machine in response to a first engine start request after key-on or when vehicle speed is below a threshold as represented by blocks 41, 412, and 440-450, and starting the engine using a second electric machine coupled to the engine through an engaged clutch in response to the vehicle speed being above the threshold or a fault in the first electric machine as represented by blocks 412-424, and 450.

Those of ordinary skill in the art will recognize that various embodiments illustrated and described herein provide robust and consistent engine starting with advantages associated with coupled and decoupled starting strategies. For example, scheduling or selection of a decoupled engine start at the first engine start of a driving cycle when the engine is cooled down and engine stop position is unknown, or at low vehicle speed and high driver demand provides consistent and reliable engine starting while minimizing impact on drivability and torque delivery to the wheels. Selection or scheduling of a decoupled engine starting strategy based on operating conditions facilitates dynamic release of motor torque otherwise reserved for engine cranking for use in propelling the vehicle.

While one or more embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that may not be explicitly described or illustrated. Various embodiments may have been described as providing advantages or being preferred over other embodiments or prior art implementations with respect to one or more desired characteristics. However, as one of ordinary skill in the art is aware, one or more features or characteristics may be compromised to achieve desired overall system attributes, which depend on the specific application and implementation. These attributes may include, but are not limited to: cost, strength, security, durability, life cycle cost, marketability, appearance, packaging, size, serviceability, weight, manufacturability, ease of assembly, etc. Embodiments described as less desirable than other embodiments or prior art implementations with respect to one or more characteristics are not outside the scope of the disclosure or claims and may be desirable for particular applications.

What is claimed is:

1. A vehicle having an engine with a starter motor and coupled by a first clutch to an electric machine, which is coupled by a second clutch to a step-ratio transmission, comprising:

a processor programmed to start the engine using the starter motor for a first engine start after vehicle key-on and if vehicle speed is less than an associated threshold, and using the electric machine if vehicle speed exceeds the associated threshold, the processor further programmed to release electric machine torque reserved for starting the engine to propel the vehicle in response to scheduling a subsequent engine start using the starter motor.

2. The vehicle of claim 1, the processor further programmed to start the engine using the electric machine in response to a starter motor fault.

3. The vehicle of claim 1, the processor further programmed to start the engine using the starter motor in response to an electric machine fault.

4. The vehicle of claim 1, the processor further programmed to disengage the first clutch when starting the engine using the starter motor.

5. The vehicle of claim 1, the processor further programmed to engage the first clutch before starting the engine using the electric machine.

6. A method for controlling a hybrid vehicle, comprising:

starting an engine using a first electric machine in response to a first engine start request after key-on and when vehicle speed is below a threshold;

starting the engine using a second electric machine coupled to the engine through an engaged clutch in response to the vehicle speed being above the threshold or a fault in the first electric machine; and scheduling a subsequent engine start using the second electric machine and releasing reserved torque of the first electric machine for use in propelling the vehicle.

7. The method of claim 6 further comprising disengaging the clutch prior to starting the engine using the first electric machine.

8. The method of claim 6 wherein the first electric machine comprises an integrated starter-generator.

9. The method of claim 6 further comprising releasing reserved torque of the second electric machine for vehicle propulsion in response to scheduling a subsequent engine start using the first electric machine.

\* \* \* \* \*